United States Patent Office 3,233,263
Patented Feb. 8, 1966

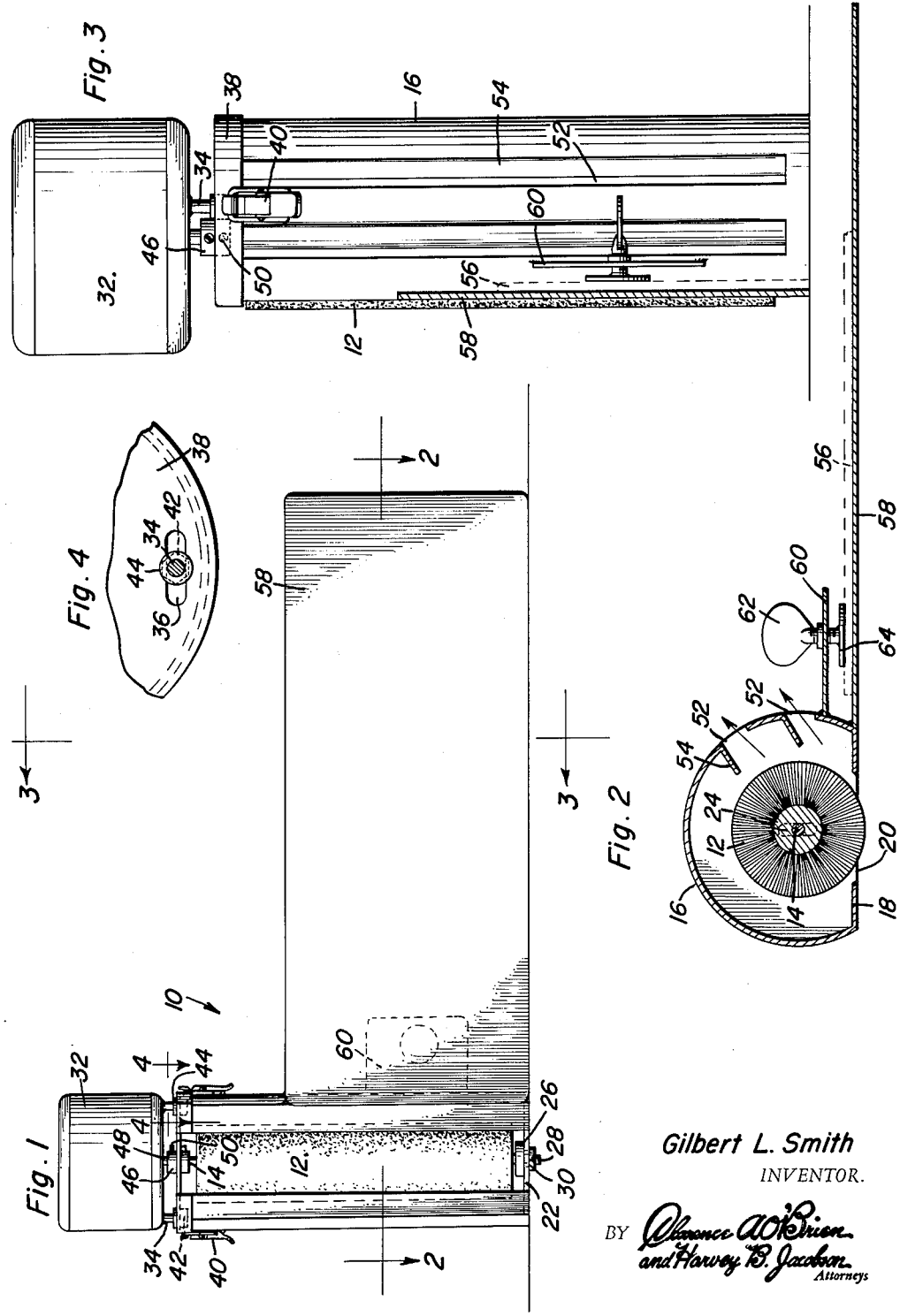

1

3,233,263
POWERED MEAT BRUSH AND CLEANER
Gilbert L. Smith, Peru, Ill., assignor to G. L. Smith Company, a corporation of Illinois
Filed Dec. 20, 1963, Ser. No. 332,194
6 Claims. (Cl. 15—3.1)

The present invention is generally concerned with meat preparation, and is more particularly directed toward a novel means for cleaning and brushing the meat immediately subsequent to the slicing of the meat, particularly in those situations wherein power saws are utilized.

Most, if not all, meat retailers or butchers now utilize electric meat saws which tend to product an unattractive surface including an accumulation of bone dust, fat and marrow. Because of this, it has been the practice to brush or otherwise clean the surface of the meat after it has been cut, this being done either manually or through the use of various types of automatic cleaning machines.

It is a primary object of the instant invention to provide an automatic device for brushing and cleaning the meat which constitutes a significant improvement over the heretofore known devices.

In achieving this primary object, the instant invention contemplates the provision of a meat cleaner which can be mounted directly at the discharge end of a conventionally used meat saw, and in fact directly on the saw guide, whereby an automatic cleaning of the cut meat is achieved as soon as the meat is cut and with substantially no additional effort in that one need merely continue the meat along its initial path in order to also engage the cut surface with the brush.

In addition, while the automatic meat brush of the instant invention is specifically adapted for removable mounting adjacent the discharge end of a meat saw, it is also an object of the instant invention that this saw be capable of being optionally mounted upon a table or stand if deemed desirable under certain circumstances.

Furthermore, it is a significant object of the instant invention that the entire device comprising the instant invention be readily disassembled for ease of cleaning.

Likewise, it is an object of the instant invention to incorporate adjustability to the cleaning device in order that the degree of engagement between the meat and the cleaning brush might be varied.

Furthermore, it is an object of the instant invention to provide a device which, although simple in construction, incorporates many significant features including durability, ease of use, and a self-cleaning feature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the automatic cleaning device of the instant invention;

FIGURE 2 is a cross-sectional view taken substantially on a plane passing along line 2—2 in FIGURE 1;

FIGURE 3 is an end elevational view of the device looking from the right hand side of FIGURE 1; and FIGURE 4 is an enlarged partial view taken substantially on a plane passing along line 4—4 in FIGURE 1 illustrating the manner in which adjustability of the cleaning brush is achieved.

Referring now more specifically to the drawings, reference numeral 10 is used to generally designate the automatic cleaning device comprising the instant invention. The actual cleaning of the meat is effected by an elongated circular brush 12 having relatively rigid bristles of any suitable material such as fiber, nylon, wire, plastic, rubber, etc. The brush 12 includes an elongated centrally located mounting shaft 14 rigid therewith and projecting beyond both ends of the brush 12 for enabling a mounting of the brush.

The brush 12 is mounted within an elongated hollow generally cylindrical casing 16 including a flat forward wall 18 having an enlarged longitudinally extending opening 20 therein through which the brush 12 will project so as to engage the cut meat moved along the flat wall 18.

The casing 16 includes a flat closed bottom 22 having a centrally located slot 24 elongated substantially along the centerline of the opening 20. A cup-type bushing 26, including a mounting means, preferably in the form of a depending threaded stub 28, is positioned on the flat bottom 22 with the stub 28 extending through the elongated slot 24 for the threaded reception of a nut 30 which is used to clamp the bearing 26 to the bottom in any of a plurality of adjusted positions along the slot 24. This bearing 26 removably receives the lower projecting end of the brush shaft 14.

The automatic driving of the brush 12 is effected through a motor 32, this motor 32 having depending threaded legs 34 welded thereto and received through elongated slots 36 at diametrically opposite points within a removable upper plate or cover 38 provided for the casing 16 and being telescopically received over the upper end of the casing 16 to which it is releasably locked by suitable clips or clamps 40. The cover 38 is of course clamped to the casing 16 in a manner so as to position the slots 36 parallel to the bottom slot 24. The threaded legs 34 are secured in a plurality of adjusted positions by suitable means such as nuts 42, means such as collars 44 rigid with the legs 34 limiting the projection of the legs 34 through the slots 36. The actual driving of the brush 12 is effected through a sleeve coupling 46 positioned through an enlarged centrally located slot in the cover 38 and fixed to both the motor drive shaft 48 and the adjoining projecting end of the brush shaft 14 by suitable means such as setscrews 50, the front portion of the depending peripheral flange of the cover 38 being removed, as shown in FIGURE 1, so as to enable access to the setscrew 50 engaged with the shaft 14. The slot through which the sleeve 46 is positioned also of course extends parallel to the slots 24 and 36.

From the foregoing description, it will be appreciated that the structure 10 can be quickly and simply disassembled for purposes of cleaning with both the motor 32 and the brush 12 being removable by merely unlocking the clamps 40, the brush 12 being released from the motor 32 by releasing a single setscrew 50. However, while a disassembling of the device will periodically be necessary so as to effect a complete cleaning of the device, it is contemplated that the brush 12 itself be self-cleaning through centrifugal force with the scraped particles being discharged through elongated vents provided in the casing just to one side of the opening 20 along the path of rotation of the brush 12. These vents 52, as will be appreciated from FIGURE 2, are formed by inwardly angling portions 54 of the casing wall, these portions 54 in turn acting somewhat as shields or guides so as to assist in directing the particles through the vents 52. The relatively stiff nature of the brush bristles assists in effecting the discharge of the scrapings resulting from the centrifugal force produced by the rotation of the brush 12.

The device 10 is preferably mounted on the guide plate of the saw used to initially cut the meat, this guide plate being generally indicated in phantom lines and referred to by reference numeral 56. In this manner, one need merely continue movement of meat along the guide plate 56 until the severed portion of the meat has also been moved past the rotating brush 12 which has been extended, through the use of the various slots, so as to project a predetermined distance outwardly of the opening 20. The actual mounting of the device 10 is effected through the use of a flat enlarged guide plate 58 forming an elongated continuation of the flat wall 18 of the casing, this guide plate being positionable against the front face of the saw guide 56. In addition, a second smaller plate 60 is provided rigid with the casing 16 and parallel to the plate 58 slightly to the rear thereof, this plate 60 having a lock screw 62 rotatably mounted therein for movement of the clamping head 64 thereof toward and away from the rear surface of the plate 58 whereby the saw guide 56 can be fixedly clamped therebetween. Through the use of this same clamping means, it will also be appreciated that the device 10 can be, if deemed desirable, mounted or clamped horizontally to, for example, a table for use independent of a saw although the preferred use of the device is in conjunction with a saw as described supra.

From the foregoing, it will be appreciated that a highly novel meat cleaning device has been defined, this device being uniquely adapted to most expeditiously perform its intended function and being unique in its adaptability for mounting immediately adjacent the point at which the cutting of the meat is to occur so as to effect an immediate cleaning of the meat.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat cleaning device comprising an elongated brush, an elongated hollow casing, means rotatably mounting the brush within the casing, said casing including an elongated opening through the wall thereof, a peripheral portion of said brush projecting through said opening, means for varying the amount of projection of the brush through said opening, an elongated generally flat plate secured to said casing and projecting outwardly therefrom in substantially the same plane as said opening, and locking means mounted on said casing rearward of said plate, said locking means being selectively movable toward and away from said plate so as to effect a clamping action therebetween.

2. A meat cleaning device consisting of an elongated hollow casing, said casing having a top and a bottom at the opposite ends thereof, a longitudinally extending opening through the wall of the casing, a bearing fixed to the bottom of said casing, an elongated meat brush located within said casing with a portion of the periphery thereof projecting through said opening, said brush including an elongated mounting shaft projecting longitudinally beyond both ends thereof, the lower projecting end of the brush shaft being removably received within the bearing, a motor means removably mounted at the top end of the casing, said motor means including a drive shaft axially aligned with the brush shaft, coupling means releasably securing the drive shaft to the brush shaft, an elongated flat plate fixed to the casing and projecting outwardly therefrom in substantially the plane of the casing opening, a second plate fixed to the casing, said second plate extending outwardly therefrom in parallel spaced relation to the first plate, and a clamping means, said clamping means adjustably mounted on said second plate for movement toward and away from said first-mentioned plate for effecting a clamping action therebetween.

3. The device of claim 2 wherein said casing includes at least one longitudinally extending discharge vent, said discharge vent located to one side of said casing opening along the rotational path of the brush.

4. The device of claim 3 wherein the top of said casing is removable, clamp means releasably clamping the top to said casing, said motor means including depending leg means, elongated slot means through said top, said leg means projecting through said slot means for adjustable positioning of the motor means, means releasably clamping the leg means in any of a plurality of adjusted positions, second slot means in said top receiving said coupling means for adjustment there along, and third slot means adjustably receiving the bearing at the bottom of the casing, said slot means being orientated so as to enable an adjustment of the meat brush in a manner so as to vary its projection through the casing opening.

5. A meat cleaning device comprising a casing, said casing defining a hollow chamber and including a generally flat front wall, an elongated transverse opening through said wall communicating with said chamber, an elongated brush, means rotatably mounting said brush within said chamber transversely of said front wall, a periphereal portion of said brush, along the entire length thereof, being projectable through said opening, means for varying the amount of projection of the brush through said opening, a major portion of said wall being located to one side of said opening so as to constitute a meat guiding surface, and locking means mounted on said casing rearwardly of the front wall, said locking means being selectively movable forward and rearward relative to the front wall so as to effect a clamped mounting of the device on a suitable structure.

6. The device of claim 5 wherein said casing includes a generally flat top, an elongated mounting shaft projecting longitudinally beyond a first end of the brush, said top including an enlarged aperture therethrough freely receiving the projecting portion of the brush shaft, said means rotatably mounting said brush including bearing means receiving that portion of the shaft above said top and rotatably mounting the brush thereby, and means engaged with the shaft for effecting a rotation of the brush about its own axis.

References Cited by the Examiner

UNITED STATES PATENTS

| | | | |
|---|---|---|---|
| 1,702,007 | 2/1929 | Jackson | 15—23 |
| 1,980,602 | 11/1934 | Toniatti | 15—77 |
| 2,799,877 | 7/1957 | Scott | 15—3.1 |
| 2,854,680 | 10/1958 | Wilson | 15—21 |
| 3,037,224 | 6/1962 | Webster | 15—21 |

CHARLES A. WILLMUTH, *Primary Examiner.*